United States Patent [19]

Layne et al.

[11] 4,012,493
[45] Mar. 15, 1977

[54] PREPARATION OF METAL FLUORIDES

[75] Inventors: Gilbert S. Layne; James O. Huml, both of Midland, Mich.

[73] Assignee: The Dow Chemical Company, Midland, Mich.

[22] Filed: June 23, 1972

[21] Appl. No.: 265,781

Related U.S. Application Data

[63] Continuation-in-part of Ser. No. 000,445, Jan. 2, 1970, abandoned.

[52] U.S. Cl. .............................. 423/489; 423/341; 423/415 R; 423/437; 423/465; 423/490; 423/659; 75/29; 75/62; 75/67 R; 75/68 A; 75/69; 75/72; 75/77; 75/81; 75/82; 75/84.1 R; 75/85; 75/86

[51] Int. Cl.$^2$ ...................... C01B 9/08; C01F 5/28; C22B 5/02; C01B 31/18

[58] Field of Search ................ 75/86, 87; 423/342, 423/490, 489, 465, 659 A, 415, 437, 341

[56] References Cited

UNITED STATES PATENTS

| | | | |
|---|---|---|---|
| 1,987,629 | 1/1935 | Miner | 75/86 X |
| 2,844,462 | 7/1958 | Wyatt | 75/86 |
| 3,323,910 | 6/1967 | Schunemann | 75/86 |

FOREIGN PATENTS OR APPLICATIONS

| | | | |
|---|---|---|---|
| 1,217,931 | 6/1966 | Germany | 423/490 |
| 794,518 | 5/1958 | United Kingdom | 423/489 |

OTHER PUBLICATIONS

J. W. Mellor's, "A Comprehensive Treatise on Inorganic and Theoretical Chemistry," vol. 22, 1922 Ed., pp. 66 and 67, Longmans, Green & Co., New York.

*Primary Examiner*—Edward Stern
*Attorney, Agent, or Firm*—Bruce M. Kanuch

[57] ABSTRACT

This invention concerns a process for preparing metal and metal fluoride products. A molten mixture containing a metal oxide, a molten metal fluorinating agent and carbon is reacted to produce a gaseous oxide of carbon, a metal fluorinated product derived from the cation of the metal oxide, and a metal derived from the cation of the metal fluorinating agent.

12 Claims, No Drawings

PREPARATION OF METAL FLUORIDES

CROSS REFERENCE TO RELATED APPLICATION

This application is a continuation-in-part of patent application Ser. No. 000,445, filed Jan. 2, 1970, now abandoned.

BACKGROUND OF THE INVENTION

There are instances where the conversion of metal oxides to metal fluorides may be desirable. For example, it may be desirable to prepare water-soluble fluoride compounds to be employed in the treatment of water supplies and the like. Also, metal fluoride fluxes sometime become contaminated with various metal oxide materials. It may be desirable to reduce the amount of metal oxide in the flux or convert the metal oxide to a metal compound which is more compatible with the flux, for example, another metal fluoride compound.

Several methods have been employed to prepare metal fluorides. The most common method employs hydrogen fluoride as a raw material. This method requires expensive specialized equipment since hydrogen fluoride must be prepared prior to the preparation of the metal fluoride.

The aqueous HF treatment of oxides is not an effective process for treating all oxides, since with many oxides, hydrates of the fluorinated products are formed, e.g., $AlF_3 \cdot 3H_2O$, $BeF_2 \cdot XH_2O$, $ThF_4 \cdot 4H_2O$ and the like. This water cannot normally be removed without reformation of substantial quantities of the original oxides. Likewise, in the aqueous HF process several steps are required, i.e. cooling, grinding, reacting, drying and remelting to prepare purified fluorinated products.

On the other hand, the direct treatment of fused salts with gaseous HF is difficult to conduct because (1) the corrosiveness of $HF_{(g)}$ requires specialized equipment; (2) the reaction rate and efficiency of HF is low requiring excessive reaction times or large $HF_{(g)}$ losses; and (3) the fluorination reaction is usually incomplete leaving substantial quantities of unreacted metal oxides.

Several other processes have also been developed for producing metal fluoride products. The teachings of U.S. Pat. Nos. 2,690,430; 2,877,095 and 2,958,576 are exemplary of other known processes. All of these processes, however, have certain inherent disadvantages associated with them which are objects to be overcome in the instant invention. For example, $CF_4$ is an expensive raw material. The process taught in U.S. Pat. No. 2,690,430 can be employed only to produce a mixture of fluoride and hydroxide or oxide. In the process taught in U.S. Pat. No. 2,877,095 anions are present which can contaminate the fluoride product. Moreover, aqueous conversion systems usually require large volumes of materials. High wastes are involved and the required dehydration step is often expensive. In another process, it has been taught to react lead fluoride with magnesium oxide to form lead oxide and magnesium fluoride.

The present invention offers the following advantages over those known in the art. First, the process is a solution reaction. This offers a more efficient process which goes substantially to completion. Secondly, metals which are immiscible with the metal fluoride product are produced in the reaction. Further, the use of carbon plus a fluorinating agent allows for the release of oxygen from the oxides at a lower temperature than when the oxide is reduced with carbon or the fluorinating agent is reacted with the oxide. In addition, in the present process, oxygen is removed as a gaseous oxide of carbon which is easier to handle than are oxides of metal. The present process can be employed to fluorinate refractory oxides. Further, the fluorinated product prepared by the present process is usually substantially free of metal oxide impurities.

SUMMARY OF THE INVENTION

The present invention comprises reacting a molten mixture containing a metal oxide, carbon and a metal fluoride reactant to produce a gaseous oxide of carbon, i.e., CO and/or $CO_2$, a metal fluoride product derived from the cation of the metal oxide and a metal product derived from the metal fluoride reactant. The metal product is immiscible with the metal fluoride product. Preferably at least a portion of the reactants are dissolved in a molten salt solvent. The solvent can comprise one or more of the group of unreacted metal fluoride reactant, metal fluoride product or a diluent salt. A metal fluoride reactant is used which is less thermodynamically stable than the desired metal fluoride product and is also miscible with the solution of the metal oxide and molten solvent.

DETAILED DESCRIPTION OF THE PRESENT INVENTION

The process of the present invention is theoretically represented by the following reaction:

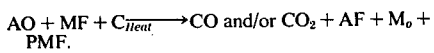

$$AO + MF + C \xrightarrow{Heat} CO \text{ and/or } CO_2 + AF + M_o + PMF.$$

In this formula, AO represents the oxide reactant; MF represents the metal fluoride reactant; C is carbon; $M_o$ is the metal product; AF is the fluoride product; PMF is excess MF, if any, wherein P represents the number of moles of excess MF (i.e., P may be zero); F is fluoride atom; O is oxygen atom.

In order to convert AO to AF and M to $M_o$, the following reaction conditions must exist. First, MF must be less thermodynamically stable than AF. Second, if M is in its lowest normal valent state (e.g., $FeF_2$ where $FeF_2$ and $FeF_3$ both exist), the atom ratio of F/O of the reactants may range from 0.01 to about 10. When operating under the above conditions, excess MF (PMF) can exist and can be employed as a diluent salt. If M is not present in its lowest normal valent state (e.g., $FeF_3$ instead of $FeF_2$), the atom ratio of F/O must range from 0.01 to less than 2 times the valence of M to insure the formation of free metallic M. If, however, it is desired to produce reaction products substantially free of MF, then the atom ratio of F/O, where M is in its lowest valent state or not, should be 2 or less.

Preferably, in all reaction systems, the atom ratio of C to O should be at least about 1. If the ratio is less than one the removal of oxygen from the reaction system may be incomplete. If the ratio is greater than 1, some free carbon may be present in the reaction products. Depending on the temperature at which the reaction is conducted CO, $CO_2$ or mixtures thereof are formed.

Reference may be made to standard references to determine the thermodynamic stabilities of the various MF reactants and AF products desired. After determining the stability of AF, an MF reactant is chosen which is less thermodynamically stable, i.e., is more reactive, than the stability of AF at the temperature at which the process is run. It is well recognized that the thermodynamic stability is, to some degree, temperature dependent.

The following Table I lists certain of the metal fluorides which may be produced and/or employed as a reactant in the practice of the present invention and their corresponding Gibbs Free Energy computed on an equivalent fluoride basis. In the present invention, the Gibbs Free Energy of the fluoride product (AF), computed on an equivalent fluoride basis, must be less than the Gibbs Free Energy of the fluorinating agent (MF), computed on an equivalent fluoride basis, at the temperature of the process. Not all the metal fluoride reactants or products which are employed in the practice of the present invention are listed in Table I. The Gibbs Free Energy values of other fluorides may be calculated, derived from standard references, or extrapolated from the data given in the table. Also, the table does not list the Gibbs Free Energy for all temperature ranges. The Gibbs Free Energy at any particular temperature can be computed by known methods and/or extrapolated from the data presented herein.

It is preferred to employ a metal fluorinating agent which has a Gibbs Free Energy, computed on an equivalent fluoride basis, which is as different from the Gibbs Free Energy of the fluorinated product as possible. In this way the maximum degree of reaction is obtained.

TABLE I

Gibbs Free Energy of Certain Fluoride Compounds on Fluoride Equivalent Basis*

| Compound | Temperature °C | | | | |
|---|---|---|---|---|---|
| | 27° | 227° | 727° | 1227° | 1727° |
| $FeF_3$ | −73 | −69.3 | −61 | −53.3 | −47.8 |
| $FeF_2$ | −78.8 | −75.5 | −67.6 | −60.4 | −54.8 |
| $AgF$ | −44.3 | −41.5 | −38.5 | −35.0 | |
| $AgF_2$ | −36.4 | −33.0 | −25.5 | | |
| $AlF_3$ | −111.2 | −108.0 | | | |
| $BiF_3$ | −65.3 | −61.7 | | | |
| $CoF_2$ | −73.9 | −70.6 | −62.1 | | |
| $CoF_3$ | −57 | −54 | −45.6 | | |
| $CrF_3$ | −83 | −79 | −70 | −60.7 | |
| $CrF_4$ | −66.7 | −63.6 | | | |
| $HgF$ | −52.3 | | | | |
| $MnF_2$ | −90 | −86.5 | −78.5 | −73.0 | |
| $NiF_2$ | −73.6 | −70.0 | −62.0 | −54.5 | |
| $PbF_2$ | −73.7 | −69.8 | −61.8 | −53.8 | |
| $PbF_4$ | −50.5 | −47.5 | | | |
| $SbF_3$ | −68 | −64.6 | | | |
| $ThF_4$ | −113.6 | −109.8 | | | |
| $UF_4$ | −107.1 | −103.7 | −95.2 | −87.7 | |
| $UF_6$ | | −79.6 | | | |
| $ZnF_2$ | −86.1 | −83.6 | −74.4 | | |
| $ZrF_4$ | −108.7 | | | | |
| $NaF$ | −130.2 | −125.2 | −112.6 | −95.9 | −78.5 |
| $MgF_2$ | −128 | −123.8 | −113.5 | −101.8 | −88.5 |
| $CaF_2$ | −140.2 | −136.1 | −126.3 | −116.8 | −106.3 |
| $Na_3AlF_6$ | −125.5 | −121 | −110.1 | −97.4 | −85.1 |
| $LiF$ | −140.7 | −136.1 | −124.3 | −115.5 | −100.3 |
| $KF$ | −128.8 | −123.8 | −111.6 | −94.2 | −78.1 |
| $BF_3$ | −89.1 | −88.1 | −85.7 | −83.1 | −80.4 |
| $SiF_4$ | −93.9 | −92.2 | −87.9 | −83.6 | −78.7 |
| $TiF_4$ | −90.5 | −89.1 | −85.5 | −81.8 | −78 |
| $HgF_2$ | −43.2 | −39.8 | −28.3 | −16.7 | −5.9 |

*These values are taken from the tables found at pages 244–247 of Smithells "Metals Reference Book," 4th Ed. or calculated from other known data.

Metal oxides which can be employed in the present process include, for example, oxides of lithium, sodium, potassium, rubidium, cesium, beryllium, magnesium, calcium, strontium, barium, aluminum and silicon; oxides of Groups IIIB, IVB and VB, and actinide and lanthanide series of the periodic table, oxides containing more than one of said elements and mixtures of these metal oxides.

Specific oxides include, for example, $MgO$, $Al_2O_3$, $MgAl_2O_4$, $NaAlO_2$, $SiO_2$, $Li_2O$, $Na_2O$, $K_2O$, $B_2O_3$, $BeO$ and $TiO_2$. In addition, the less common oxides, such as $UO_2$, $CeO_2$, $ThO_2$, $Y_2O_3$, $U_2O_3$, are also fluorinated according to the instant invention.

The metal fluorinating agent is a metal fluoride whose Gibbs Free Energy of formation (computed on an equivalent fluoride basis), at the reaction temperature, is greater than the Gibbs Free Energy of formation (computed on an equivalent fluoride basis) of the fluorinated product derived from the cation of the metal oxide. That is, the fluorinating agent is less thermodynamically stable than the fluorinated product. Thus, in any particular reaction, the metal fluorinating agent will depend on the particular metal oxide employed. Exemplary of suitable metal fluorinating agents are $MnF_2$, $FeF_2$, $FeF_3$, $CoF_3$, $NiF_2$, $CuF_2$, $ZnF_2$, $AgF$, $AgF_2$, $CdF_2$, $BiF_3$, $SnF_2$, $SnF_4$, $CrF_2$, $CrF_3$, $HgF_2$, $SbF_3$, $GaF_3$, $PbF_2$, mixtures thereof and the like. The fluorides of lead, iron and copper are preferred because of their availability and the formation of a dense immiscible metal phase. Zinc, mercury and cadmium fluorides form volatile metal phases and are easily separated from the reaction products.

Carbon may be employed in any convenient solid form, e.g., graphite, coke, charcoal, carbon black, anthracite, etc.

A molten salt solvent, one in which the metal oxide is soluble, can be employed. Included by way of example are unreacted metal fluorinating agents, the fluorinated product produced and/or diluent salts. The diluent salt is preferably chemically inert to the reactants and products, but may be in some instances reactive to some degree with ingredients of the system. Examples of diluent salts are $NaF$, $MgF_2$, $CaF_2$ and $Na_3AlF_6$.

The process is carried out at a temperature which is sufficient to fuse the metal fluoride salt and dissolve at least a portion of the metal oxide therein. Generally, the temperature necessary for the reaction to proceed is less than that required to reduce the metal oxide with carbon. The minimum temperature is dependent on the temperature required to maintain the reaction system in a molten state (there is some release of gaseous products, e.g., $CO$ and/or $CO_2$, $SiF_4$, etc., depending on the reactants involved).

One important advantage of the present process is that harmful contaminating oxygen is driven off as a gaseous compound.

The AF and $M_o$ products can be separated in a number of different ways including distillation, liquid-liquid (molten) separation, liquid (molten)-solid separation, or solid-solid separation. The separation method employed is determined by the physical characteristics of the reaction products at the temperature chosen to make the separation. This separation may be carried out at any convenient temperature at which the reaction products are stable.

As previously indicated, one of the utilities offered by the present process is to reduce the concentration of metal oxide contaminants contained in metal fluoride mixtures. For example, in the process of U.S. Pat. No. 3,397,056, a molten metal fluoride (preferably $MgF_2$) can become contaminated in the distiller with various oxides, e.g., $Al_2O_3$, $MgAl_2O_4$, as oxygen is inadvertently admitted to the reaction system. Carbon is also often present. It is desirable to reduce the concentration of oxides in the fluoride salt phase remaining in the distiller since their presence increases the melting point of the metal fluoride mixture and also reduces the thermodynamic activity thereof. Carbon may adversely affect the fluidity of the salt. The contaminated metal fluoride is separated from the depleted aluminum source material and treated to adjust the carbon to oxygen atom ratio to at least about one, preferably to about one (e.g., by the addition of C or a metal oxide). The contaminated metal fluoride is then treated by the method defined hereinbefore to convert at least a portion of the metal oxide to a fluorinated product and remove oxygen and carbon as gaseous oxides of carbon. As an example of such treatment, the carbon to oxygen atom ratio in the mix is adjusted to about 1. The fluoride to oxygen atom ratio is adjusted to about 2/1 by the addition of $FeF_2$. The system is reacted at a temperature of about 1400° C. The reaction which takes place is theorized as follows:

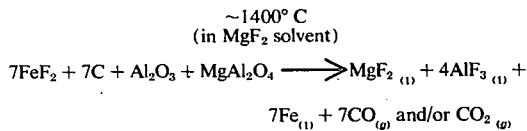

$$7FeF_2 + 7C + Al_2O_3 + MgAl_2O_4 \xrightarrow[\text{(in } MgF_2 \text{ solvent)}]{\sim 1400° C} MgF_{2\,(l)} + 4AlF_{3\,(l)} + 7Fe_{(l)} + 7CO_{(g)} \text{ and/or } CO_{2\,(g)}$$

wherein $FeF_2$ is the metal fluorinating agent, $Al_2O_3$ and $MgAl_2O_4$ are the metal oxide reactants and $MgF_2$, $FeF_2$, $AlF_3$ comprise the molten salt solvent. $MgF_2$ and $AlF_3$ are also the fluorinated products and Fe is the metal product. CO and/or $CO_2$ is separated from the reaction mixture such as by venting. Because of density differences, carbon saturated Fe can be separated from the reaction system by liquid underflow, centrifugation or solidification followed by material classification. $AlF_3$ may be separated from the $MgF_2$ and the $MgF_2$ returned to the distiller for further reaction with an impure aluminum source. However, the presence of $AlF_3$ is not harmful to the process described in U.S. Pat. No. 3,397,056 so that both the magnesium fluoride and aluminum fluoride may be returned to the distiller if desired. The teachings of U.S. Pat. No. 3,397,056 are specifically incorporated herein by reference.

EXAMPLE 1

A mixture of stoichiometric amounts (based on the reaction $MgO + C + FeF_2 \rightarrow MgF_2 + Fe + CO$) of minus 100 mesh powdered MgO, $FeF_2$ and C was heated in a graphite crucible to a temperature of about 1450° C and maintained at that temperature under an argon atmosphere for about 2 hours. CO was liberated freely beginning at about 900° C and continued throughout the heating. At about 1300° C the entire mixture appeared to be in a molten form. Upon cooling of the reaction mixture, a dense salt phase and a discrete metal phase were found. The conversion of MgO to $MgF_2$ based on iron metal recovered was 103 percent and based on the salt recovered 99.5 percent. Freezing point data obtained on the salt phase gave a value of 1250° C (1265° C being the accepted value for $MgF_2$). X-ray diffraction analysis of the salt phase showed $MgF_2$ to be the only crystalline phase. Wet chemical analysis of the salt phase showed it contained 0.10 percent MgO, <0.005 percent carbon and 0.10 percent Fe. Wet chemical analysis of the metal phase showed 95.2 percent Fe and 4.9 percent C.

This example shows the use of the present method to convert an oxide (MgO) directly to a fluorinated product ($MgF_2$) with the production of iron (Fe) and the removal of oxygen as gaseous CO. Because of complete liquid immiscibility the solid Fe and $MgF_2$ phases were easily parted after being cooled and solidified.

EXAMPLE 2

To 32.5 grams of magnesium fluoride ($MgF_2$), containing about 20 percent by weight $MgAl_2O_4$ and about 8 percent by weight carbon, was added 30.5 grams of $FeF_2$ (as a metal fluorinating agent) in a graphite crucible. The crucible was placed in, and insulated from, a gas tight quartz shell and induction heated to 1400° C for about three hours. A combustible gas (CO) was released from the reaction mass at about the fusion temperature of $FeF_2$ (~975° C) and continued as heating progressed. When the evolution of gas ceased (at ~1400° C), the heating was stopped and the crucible and contents were cooled to room temperature.

A two-phase system was produced comprising a solid metal and salt phase. These separated easily from one another and from the crucible. The metal phase weighed 13.66 grams and the salt phase weighed 45.97 grams. X-ray diffraction analysis of the salt phase showed $MgF_2$ with 5-15 percent $AlF_3$ as the only observable phases. The theorized reaction which took place is:

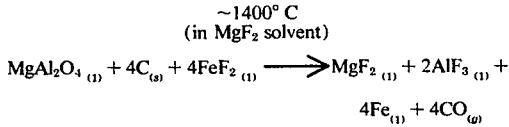

$$MgAl_2O_{4\,(l)} + 4C_{(s)} + 4FeF_{2\,(l)} \xrightarrow[\text{(in } MgF_2 \text{ solvent)}]{\sim 1400° C} MgF_{2\,(l)} + 2AlF_{3\,(l)} + 4Fe_{(l)} + 4CO_{(g)}$$

This example shows the conversion of a contaminating oxide material in a fluoride salt to prepare fluoride salts of Mg and Al, with the removal of oxygen and carbon as gaseous CO. This method can be used to purify the contaminated metal fluoride formed in the process described in U.S. Pat. No. 3,397,056.

EXAMPLE 3

The present invention was employed to produce the commercially important salt, cryolite ($Na_3AlF_6$), according to the following equation:

$$3FeF_2 + Al_2O_3 + 3C + 6NaF \rightarrow 3CO + 2Na_3AlF_6 + 3Fe$$

the procedure comprised heating $Al_2O_3$, carbon, NaF and $FeF_2$ in the indicated stoichiometric amounts to 1200° C in a graphite crucible for 2 hours. The cooled solidified final products were a dense, slightly "off-white" salt phase and an iron phase. They separated easily into 2 large pieces. Conversion was determined as follows:

| | |
|---|---|
| Based on recovered Fe | 96 % |
| Based on wt. change of salt phase | 95.4% |
| Based on wt. loss (CO evolution) | 92.4% |

X-ray diffraction analysis revealed $Na_3AlF_6$ with from 5-15 wt. percent NaF as the constituents of the salt phase and Fe with some salt inclusions as the constituents of the metal phase. Emission spectrographic analysis of the salt phase showed 0.03% Fe, 0.02% Mg and 0.01% Si as the only impurities. In this example NaF serves as both a diluent solvent and as a necessary component of the product, $Na_3AlF_6$.

In a similar manner, sodium aluminate (NaAlO$_2$) is substituted for Al$_2$O$_3$ and a portion of the NaF to also produce cryolite.

In still another procedure, NaAlO$_2$ is substituted for Al$_2$O$_3$ and Na$_2$O is substituted for NaF to produce cryolite according to the following equation:

$$3FeF_2 + NaAlO_2 + Na_2O + 3C \rightarrow Na_3AlF_6 + 3CO + 3Fe$$

The above reactions should be run at a temperature of at least about 900° C.

EXAMPLE 4

In this example MgF$_2$, containing stoichiometric amounts of carbon and SiO$_2$, is reacted with ZnF$_2$ at a temperature of about 1300° C to form gaseous CO, SiF$_4$ and Zn. The active ingredients react according to the equation:

$$MgF_2 + 2ZnF_2 + SiO_2 + 2C \rightarrow SiF_{4(g)} + 2CO_{(g)} + 2Zn_{(g)} + MgF_2$$

In this manner highly purified molten MgF$_2$ is produced since all the other products of the reaction are gases. MgF$_2$ functions as a diluent salt in the reaction since it is more thermodynamically stable than both SiF$_4$ and ZnF$_2$. ZnF$_2$ is less thermodynamically stable at 1300° C than SiF$_{4(g)}$.

What is claimed is:

1. A process for simultaneously preparing metal and metal fluoride products which comprises:
   a. reacting in a reaction zone a molten mixture containing at least one metal oxide, at least one metal fluorinating agent selected from the group consisting of a fluoride of iron, lead or copper, and carbon, said reactants provided in an amount to establish a fluoride atom to oxygen atom ratio of the reactants ranging from about 0.1 to less than 2 times the valence of the cation of the metal fluorinating agent to produce a metal fluoride product containing the cation of the metal oxide reactant, elemental metal from the cation of said fluorinating agent, and a gaseous oxide of carbon, said fluorinating agent having a Gibbs Free Energy computed on an equivalent fluoride basis which is greater than the Gibbs Free Energy of the metal fluoride product, and
   b. separating said reaction products from each other.

2. A process for simultaneously preparing a metal and a metal fluoride which comprises:
   a. reacting in a reaction zone a molten mixture containing at least one metal oxide, at least one molten metal fluorinating agent selected from the group consisting of a fluoride of iron, lead or copper, and carbon, said reactants provided in an amount to establish a fluoride to oxygen atom ratio of said reactants ranging from about 0.01 to about 10, said metal fluorinating agent having a cation which is in its lowest stable valence state, to produce a metal fluoride product containing the cation of the metal oxide reactant, a metallic form of the cation of the metal fluorinating agent and a gaseous oxide of carbon, said fluorinating agent having a Gibbs Free Energy computed on an equivalent fluoride basis which is greater than the Gibbs Free Energy of the metal fluoride product, and
   b. separating said reaction products from each other.

3. A process comprising:
   a. reacting in a reaction zone a molten mixture containing at least one metal oxide dissolved in a molten metal salt solvent, carbon and at least one metal fluorinating agent selected from the group consisting of MnF$_2$, FeF$_2$, CoF$_2$, NiF$_2$, CuF$_2$, ZnF$_2$, AgF, CdF$_2$, BiF$_3$, SnF$_2$, CrF$_2$, HgF$_2$, SbF$_3$, GaF$_3$, or PbF$_2$, to produce a gaseous oxide of carbon, at least one fluorinated product derived from the cation of the metal oxide and a metal immiscible with the molten salt solvent, said metal being derived from said metal fluorinating agent; said molten salt solvent being one or more of the group of unreacted metal fluorinating agent, fluorinated product or diluent salt; said metal fluorinating agent being less thermodynamically stable than the metal fluoride product and miscible with the solution of metal oxide in the molten salt solvent, and the cation of said metal fluorinating agent being in its lowest stable valence state, said reaction being carried out at a temperature sufficient to fuse said solvent and dissolve the metal oxide therein, and
   b. separating said reaction products from each other.

4. A process comprising:
   a. reacting in a reaction zone a molten mixture containing SiO$_2$ dissolved in MgF$_2$ solvent, carbon, and ZnF$_2$, to produce a gaseous oxide of carbon, Zn, SiF$_4$ vapors and molten MgF$_2$, said reaction being carried out at a temperature sufficient to fuse said MgF$_2$ solvent and dissolve SiO$_2$ therein, and
   b. separating said reaction products from each other.

5. The process as defined in claim 1 including in addition a diluent metal fluoride salt selected from the group consisting of at least one of MgF$_2$, CaF$_2$, NaF or Na$_3$AlF$_6$.

6. The process as defined in claim 1 wherein the metal oxide is at least one of MgO, Al$_2$O$_3$, MgAl$_2$O$_4$ or SiO$_2$.

7. The process as defined in claim 2 including in addition a diluent metal fluoride salt selected from the group consisting of at least one of MgF$_2$, CaF$_2$, NaF or Na$_3$AlF$_6$.

8. The process as defined in claim 2 wherein the metal oxide is selected from the group consisting of at least one of MgO, Al$_2$O$_3$, MgAl$_2$O$_4$ or SiO$_2$.

9. The process as defined in claim 3 wherein the metal oxide is at least one of MgO, Al$_2$O$_3$, MgAl$_2$O$_4$, SiO$_2$, Li$_2$O, Na$_2$O, K$_2$O, B$_2$O$_3$, BeO, BiO$_2$, CeO$_2$, UO$_2$ and ThO$_2$.

10. The process as defined in claim 3 wherein the metal fluorinating agent is at least one of FeF$_2$, PbF$_2$ or CuF$_2$.

11. The process as defined in claim 3 wherein the diluent molten salt solvent is at least one of MgF$_2$, CaF$_2$, NaF or Na$_3$AlF$_6$.

12. The process as defined in claim 3 wherein the metal oxide is at least one of MgO, Al$_2$O$_3$, MgAl$_2$O$_4$ and SiO$_2$.

* * * * *

UNITED STATES PATENT OFFICE
CERTIFICATE OF CORRECTION

Patent No. 4,012,493   Dated March 15, 1977

Inventor(s) Gilbert S. Layne et al.

It is certified that error appears in the above-identified patent and that said Letters Patent are hereby corrected as shown below:

Under "References Cited" include --S.N. 292,742  7/1943
Beck et al  423/659--.

Correct the following formulas:

Column 2, should read:

$$AO + MF + C \xrightarrow{Heat} CO \text{ and/or } CO_2 + AF + M_o + PMF.$$

Column 6, Example 3, should read:

$$3FeF_2 + Al_2O_3 + 3C + 6NaF \longrightarrow 3CO + 2Na_3AlF_6 + 3Fe$$

Column 7, first formula, should read:

$$3FeF_2 + NaAlO_2 + Na_2O + 3C \longrightarrow Na_3AlF_6 + 3CO + 3Fe$$

Column 7, Example 4, should read:

$$MgF_2 + 2ZnF_2 + SiO_2 + 2C \longrightarrow SiF_{4(g)} + 2CO_{(g)} + 2Zn_{(g)} + MgF_2$$

Signed and Sealed this nineteenth Day of July 1977

[SEAL]

Attest:

RUTH C. MASON
*Attesting Officer*

C. MARSHALL DANN
*Commissioner of Patents and Trademarks*